United States Patent
Bhutani et al.

[15] 3,647,199
[45] Mar. 7, 1972

[54] VARIABLE-DAMPING LIQUID SPRING

[72] Inventors: Harish K. Bhutani, Downey; Giles A. Kendall, Tarzana, both of Calif.

[73] Assignee: Menasco Manufacturing Company, Los Angeles, Calif.

[22] Filed: May 7, 1970

[21] Appl. No.: 35,335

[52] U.S. Cl. .................................267/124, 267/64, 267/65
[51] Int. Cl. ..........................................................F16f 5/00
[58] Field of Search ....................................267/64, 65, 124

[56] References Cited

UNITED STATES PATENTS 3,078,967 2/1963 Brown et al..............................267/64
2,767,978 10/1956 Keeger.....................................267/64

Primary Examiner—James B. Marbert
Attorney—Elwood S. Kendrick, Thomas H. Jones and Kendrick and Subkow

[57] ABSTRACT

A variable-damping liquid spring having a housing adapted to contain a compressible fluid under pressure, a piston means extending into the said housing in slidable sealing engagement therewith, and damping means positioned within said housing which provide a variable fluid flow pattern to permit changes in the rate or direction of fluid flow within the housing during relative movement between the piston means and housing. A plurality of sleeves may be mounted within the housing with each of the sleeves having apertures therein. One fluid flow pattern during relative movement between the piston means and housing is established by the flow alignment of one set of apertures in the sleeves and another flow pattern during relative movement between the piston means and housing is established by the flow alignment of a different set of apertures in the sleeves.

14 Claims, 4 Drawing Figures

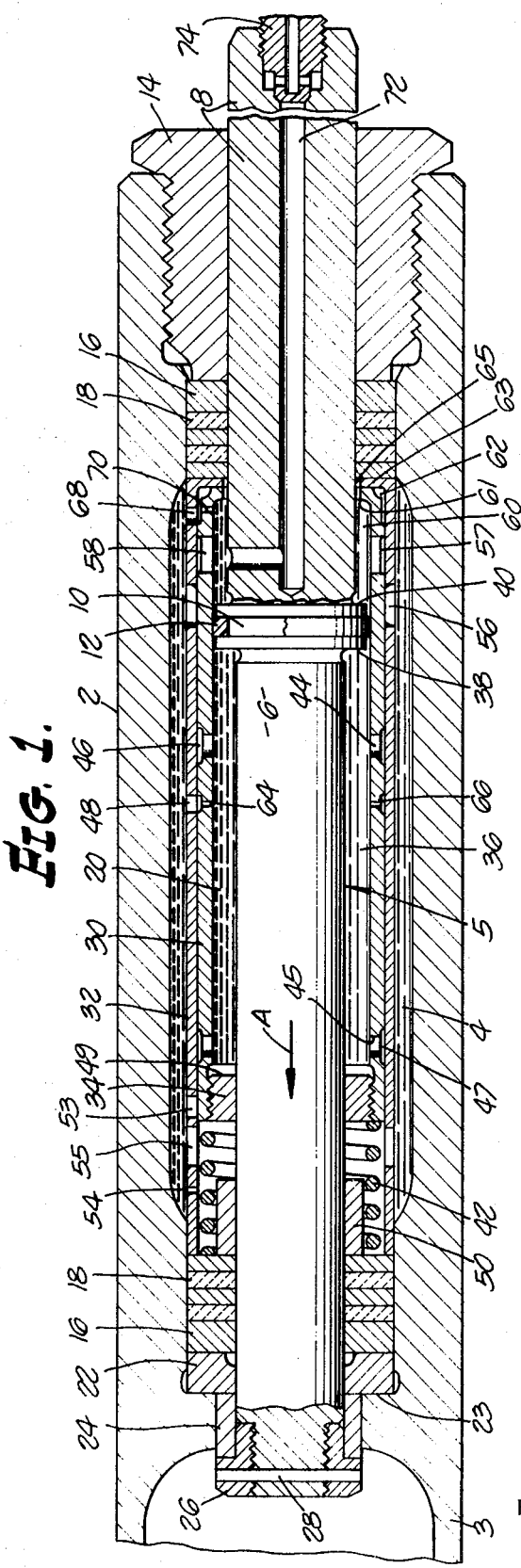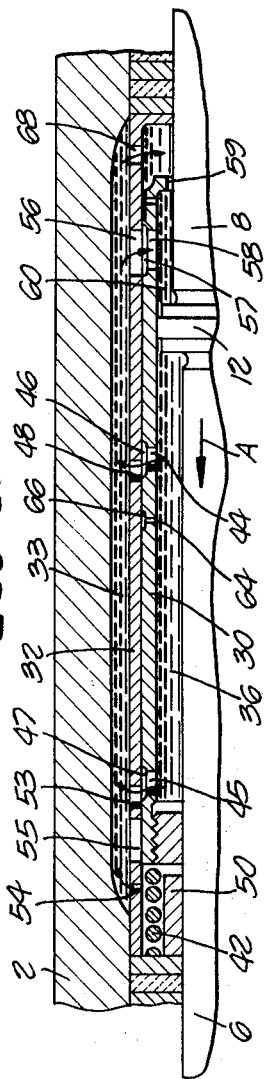

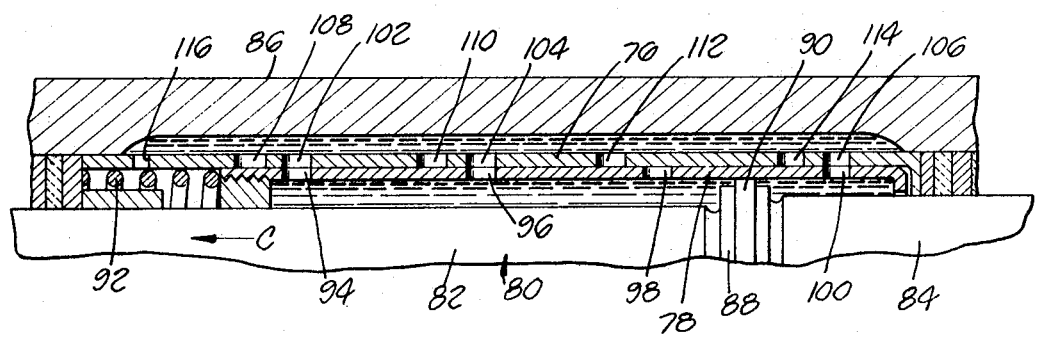
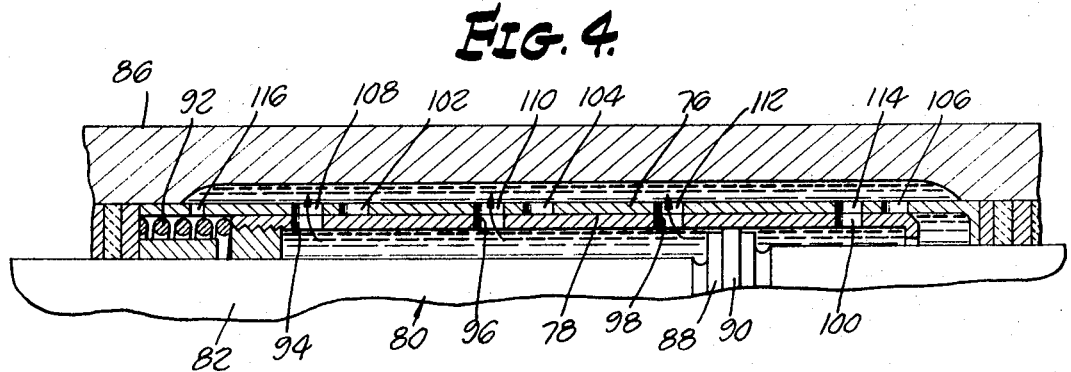

VARIABLE-DAMPING LIQUID SPRING

This invention relates to an improved high-pressure liquid spring. More specifically, the invention pertains to an improved high-pressure liquid spring which has means for varying the damping within the spring during relative movement between the piston means and housing.

Liquid springs are well known to the art and employ a cylinder which contains a compressible fluid, such as a silicone fluid. A piston rod extends into the cylinder and on movement of the piston rod into the cylinder the free volume of the cylinder is reduced. Inasmuch as the cylinder is completely filled with the compressible fluid, the liquid is thereby compressed which results in the production of high pressures that tend to return the piston rod to its rest position.

Liquid springs, as previously employed, have provided damping during movement between the piston rod and cylinder. However, means were not provided to vary or change the damping during movement between the piston rod and cylinder.

In the use of a liquid spring, the piston rod occupies a rest position within a cylinder which contains a compressible liquid. The rest position of the piston rod is determined by the force applied to the piston rod when at rest and also the pressure of the liquid within the cylinder. When an unbalanced force is applied to the piston rod, the rod is pushed further into the compressible fluid which increases the pressure of the fluid due to the decreased volume which it occupies. Movement of the piston rod into the compressible fluid as a result of an unbalanced force will be termed the "forward stroke" of the piston rod. During the forward stroke, the compressible fluid is placed under greater pressure due to the decreased volume which it occupies. The increased pressure exerts a restoring force on the piston rod which resists the unbalanced force causing its forward stroke. On removal of the unbalanced force, the restoring force exerted by the compressible fluid returns the piston rod to its rest position. The return of the piston rod to its rest position as a result of the restoring force will be termed the "return stroke" of the piston rod.

The efficiency of a liquid spring is measured by its ability to absorb energy. This can be visualized in terms of a diagram in which the load applied to the spring is plotted on the vertical axis while the distance through which the load moves, i.e., the distance moved by the piston rod, is plotted on the horizontal axis. The area under the load-distance curve is equal to the energy absorbed by the spring.

In the case of an inefficient spring, the load applied to the spring may rise to a very high level in absorbing a given energy loading. In an efficient spring, the same energy may be absorbed at a much lower loading to the spring. This can be visualized in terms of an area under the load-distance curve resembling a triangle in the case of an inefficient spring and a rectangle in the case of an efficient spring. The high loading applied to an inefficient spring in absorbing a given amount of energy requires that the supports for the spring must be capable of withstanding the high loading. If the weight of the supports is important to the overall design, as in the case of a liquid spring supported by an airframe, the use of an inefficient spring could impose an intolerable weight penalty on the airframe design. Conversely, if the spring used is quite efficient, the support members for the spring, e.g., an airframe member, can be made lighter since the spring is capable of absorbing high energy loading without exceeding the strength of the support member.

The efficiency of a liquid spring can be improved by more effectively damping the spring. By virtue of the present invention the damping of liquid springs can be made more effective since the damping of the spring can be varied during relative movement of the piston rod and cylinder. This permits the design of liquid springs which can effectively absorb energy during movement of the piston rod in either direction with respect to the cylinder. It permits the control of damping with the movement of the piston rod in either direction and it allows us to more accurately control the velocity of movement of the piston rod in either direction with respect to the cylinder.

To further illustrate our invention, reference is made to the accompanying drawing in which:

FIG. 1 is a longitudinal sectional view of an improved liquid spring according to the invention;

FIG. 2 is an enlarged detail sectional view showing the position of the elements of the liquid spring during the forward stroke of the piston rod;

FIG. 3 is an enlarged detail sectional view of another embodiment of our invention, and FIG. 4 is a further detail sectional view of the embodiment shown in FIG. 3 during a forward stroke of the piston rod.

As shown in FIG. 1, a cylinder 2 defines an enclosed chamber 4 which contains a compressible liquid 20. Extending into the compressible liquid is a piston rod 5 which comprises a larger diameter shaft 8 and a smaller diameter shaft 6. When the piston rod 5 undergoes a forward stroke, as the result of an unbalanced force, the larger diameter shaft 8 is moved into chamber 4 a certain distance while the smaller diameter shaft 6 is moved out of chamber 4 a corresponding distance. As shown in FIG. 1, this can be visualized as a movement of the piston rod 5 in the direction indicated by the arrow A.

The piston rod 5 passes through seals which permit movement of the piston rod relative to cylinder 2 while, at the same time preventing leakage of compressible fluid 20 past the piston rod. As illustrated in FIG. 1, the seals may comprise a plurality of washers 16 and 18. Washers 16 are made of a hard materials, such as a metal, while washers 18 are made of a resilient compressible material. As the pressure exerted by the compressible fluid 20 within the chamber 4 is increased, the increased pressure is transmitted to the inner washers 16 in contact with compressible fluid 20. The increased pressure is in turn transmitted to the resilient washers 18 which undergo an incremental increase in compression corresponding to the increased pressure. As a result of the incremental increase in compression, resilient washers 18 expand radially to exert a greater force on the exterior surface of piston rod 5 and also on the interior surface of the cylinder 2. Seals of this type are known to the prior art and do not form a part of our invention. The seals are described in detail only to illustrate a suitable seal for a liquid spring in which the sealing force is proportional to the pressure exerted by the compressible fluid 20 within the cylinder 2.

On movement of the piston rod 5 in the direction of arrow A, the free volume within the chamber 4 is reduced. This occurs because the volume occupied by the larger diameter shaft 8 as it moves into the chamber 4 is larger than that previously occupied by the smaller diameter shaft 6. This causes an increase in the pressure of the compressible fluid 20. A piston 10 carried by piston rod 5 has an inner face 38 and an outer face 40, both of which are in contact with compressible fluid 20. The surface area of outer face 40 is less than that of the inner face 38. Consequently, the force exerted by compressible fluid 20 against the inner face 38 is greater than that exerted against the outer face 40. This provides a restoring force which opposes the movement of the piston rod 5 in the direction of arrow A, and returns the piston rod 5 to its rest position when the unbalanced force causing its movement is removed.

A piston ring 12 is carried in a groove in piston 10 in slidable contact with an inner damping sleeve 30. Concentrically mounted about the inner damping sleeve 30 is an outer damping sleeve 32. The outer damping sleeve 32 occupies a fixed position within cylinder 2 and acts as a strut in holding the seals at either end of piston rod 5 in a spaced-apart relation.

The seal in slidable engagement with the smaller diameter shaft 6 is held in position by a bearing plate 22 which contacts a shoulder 23 on the interior of cylinder 2. Positioned outwardly of the bearing plate 22 is a sleeve 24 in slidable engagement with the smaller diameter shaft 6. The outer end of the smaller diameter shaft 6 threadedly engages a bearing nut 26 which may be held with respect to the shaft by a pin 28.

The seal in slidable engagement with larger diameter shaft 8 is fixedly held between the outer end of damping sleeve 32 and an end plate 14 which threadedly engages the interior of cylinder 2. As illustrated in FIG. 1, the cylinder 2 may comprise a part of a load-bearing member as indicated by the extension 3 of the cylinder 2. Thus, an unbalanced force may be exerted through extension 3 which transmits the load to cylinder 2 and causes it to move in a direction opposite to that indicated by arrow A. Movement of the cylinder 2 in a direction opposite to arrow A is, of course, the same as moving the piston rod 5 in the direction of the arrow A in terms of the relative movement between the cylinder 2 and piston rod 5.

In use of the liquid spring, the outer end of the larger diameter shaft 8 may be connected by a suitable means (not shown) to a load-bearing member. Either the cylinder 2 or piston rod 5 may be fixed. Thus, relative movement of cylinder 2 with respect to piston rod 5 may occur by movement of cylinder 2 with respect to a relatively fixed piston rod 5 or movement of piston rod 5 with respect to a relatively fixed cylinder 2. To accommodate relative movement of the piston rod 5 with respect to cylinder 2, the extension 3 of cylinder 2 may be hollowed out to accommodate movement of the smaller diameter shaft 6 out of the enclosed chamber 4 within cylinder 2.

The inner damping sleeve 30 has a threaded inner portion which engages a nut 34 or inwardly extending closure having a central opening in slidable engagement with smaller diameter shaft 6. A spring 42 bears at one end against the seal which engages smaller diameter shaft 6 and bears at its other end against the inner damping sleeve 30 which tends to hold sleeve 30 in the position shown in FIG. 1.

A first chamber 36 is defined by the inner surface 49 of nut 34 and the point of the slidable contact of piston ring 12 with the interior surface of inner sleeve 30. On movement of piston rod 5 in the direction of arrow A, the pressure within chamber 36 is greater than the biasing force exerted by spring 42. As a result, the movable inner sleeve 30 and the nut 34 are moved in the direction of arrow A which causes compression of spring 42. The position of the inner damping sleeve 30 under this condition is shown in FIG. 2. As there shown, spring 42 has been compressed, and the inner damping sleeve 30 has undergone relative movement with respect to the fixed outer damping sleeve 32.

On movement of inner damping sleeve 30 to the position shown in FIG. 2, holes 44 and 45 in inner damping sleeve 30, which are relatively large in size, are brought into alignment with holes 48 and 53 in the outer damping sleeve 32. Holes 44 and 45 communicate respectively with circumferential grooved channels 46 and 47 in the outer surface of inner damping sleeve 30. By virtue of the circumferential grooved channels 47 and 46, a fluid passageway is established between holes 45 and 53 and between holes 44 and 48 irrespective of the rotational alignment of inner damping sleeve 30 and outer damping sleeve 32. If hole 45 is not rotationally aligned with hole 53 on movement of inner damping sleeve 30 to its position in FIG. 2, fluid flow occurs through hole 45 to the circumferential groove 47 and then through hole 53. Circumferential groove 46 functions in a like manner if hole 44 is not rotationally aligned with hole 48 on movement of inner damping sleeve 30 to its position in FIG. 2.

The fluid flow passages established by hole 45, circumferential groove 47, and hole 53, and also hole 44, circumferential groove 46 and hole 48 permit fluid flow out of the chamber 36. This provides damping of the liquid spring on movement of the piston rod 5 in the direction of arrow A. Due to the relatively large size of holes 44 and 45, compressible fluid flows rapidly out of chamber 36 to provide a fast movement of piston rod 5 on its forward stroke.

The compressible fluid, after flowing from chamber 36 into an annulus 33, then flows through holes 56 and 68 in outer damping sleeve 32. Hole 56, as shown in FIG. 2, communicates with a circumferentially grooved channel 57 in the outer surface of inner damping sleeve 30 which communicates with a hole 58 in inner damping sleeve 30. Both holes 56 and 58 are of a relatively large size to permit rapid flow of the compressible liquid during the forward stroke of the piston rod 5. A resilient stop member 50 protects the inner damping sleeve 30 and spring 42 from damage due to excess movement of sleeve 30 in the direction of arrow A.

A hole 59 in an end portion 61 of the inner sleeve 30 surrounds the larger diameter shaft 8 and provides an opening for the flow of compressible fluid. When inner damping sleeve 30 is in the position shown in FIG. 2, fluid passing through hole 68 may then pass through hole 59. During movement of inner sleeve 30 from its position in FIG. 2 to its position in FIG. 1, or vice-versa, compressible fluid can flow through hole 59 to permit movement of sleeve 30. When sleeve 30 is in the position shown in FIG. 1, hole 59 is closed by a contact of the end portion 61 of sleeve 30 and an end portion 63 of outer sleeve 32. A hole 65 in the end portion 63 surrounds larger diameter shaft 8 and is in slidable engagement therewith.

The outer damping sleeve 32 contains a relatively large diameter hole 55 which is uncovered when inner damping sleeve 30 is in the position shown in FIG. 1. As inner damping sleeve 30 and nut 34 move in the direction of arrow A during the forward stroke of piston rod 5, there is a rapid flow of compressible fluid from the region of spring 42 through the hole 55. This permits a relatively quick movement of the inner damping sleeve 30 and nut 34 in the direction of arrow A. However, as shown in FIG. 2, the movement of inner damping sleeve 30 and nut 34 in the direction of arrow A closes the hole 55. Compressible fluid remaining in the region of spring 42 after closure of hole 55 flows into annulus 33 through a smaller hole 54. Inasmuch as hole 54 is relatively small in size, a pressure buildup occurs in the region of spring 42 when the inner damping sleeve 30 and nut 34 have reached the position shown in FIG. 2. The buildup of pressure slows down the movement of inner damping sleeve 30 and nut 34 in the direction of arrow A.

After forward movement of piston rod 5 in the direction of arrow A has been completed, the spring 42 returns the inner damping sleeve 30 and nut 34 to the position shown in FIG. 1. As this occurs, the relatively large diameter holes 44, 45 and 58 in inner damping sleeve 30 move out of alignment with corresponding holes 48, 53 and 56 in outer damping sleeve 32. Also, at the same time, the restoring force exerted by the compressible fluid 20 acts to return the piston rod 5 to its rest position such that it undergoes movement in a direction opposite to that indicated by arrow A.

A second chamber 60 is defined by the end portion 61 of inner damping sleeve 30 and the point of sliding contact of the piston ring 12 with the interior surface of inner damping sleeve 30. The pressure within chamber 60 is increased during the return stroke of piston rod 5 which tends to slow down the speed of the return stroke.

As piston rod 5 undergoes its return stroke, the compressible fluid within chamber 60 flows through a relatively small diameter hole 70 into a circumferentially undercut passage 62 in inner sleeve 30 and then through hole 68 in outer damping sleeve 32. Since hole 70 is of a relatively small size, the flow of compressible fluid occurs at a relatively slow rate. On return of the inner damping sleeve 30 to the position shown in FIG. 1, a relatively small diameter hole 64 in sleeve 30 is brought into alignment with hole 48 in outer damping sleeve 32. A circumferentially grooved channel 66 communicates with hole 64 to provide a flow path between holes 48 and 64 irrespective of the rotational alignment of inner damping sleeve 30 and outer damping sleeve 32.

During the return stroke of the piston rod 5, fluid also flows from the annulus 33 into the region of the spring 42 through hole 55 which is uncovered and through hole 54. Inasmuch as hole 55 is considerably larger than hole 54, most of the fluid flows through hole 55.

The liquid spring of our invention may be used for a wide range of applied loads. The characteristics of the spring can be changed by varying the pressure of the compressible fluid within the cylinder 2. For example, if the liquid spring is to be used for very high loadings, the compressible fluid within the liquid spring will be maintained at correspondingly high pressures. However, if the liquid spring is to be used for lower applied loadings, the pressure of the compressible fluid within the cylinder 2 will be correspondingly reduced. Varying the pressure of the compressible fluid within cylinder 2 will also change the stiffness of the spring and the length of the stroke of piston rod 5. Thus, if the initial pressure of the compressible fluid 20 is relatively low, piston rod 5 will undergo a relatively long forward stroke under the influence of a given unbalanced force. Conversely, if the pressure of the compressible fluid 20 within the liquid spring is initially high, an unbalanced force applied to piston rod 5 would cause a relatively short forward stroke of the piston rod.

A fluid pressurization passage 72 in the bore of the larger diameter shaft 8 is used to pressurize the compressible fluid 20 within the liquid spring. An end cap 74 in threaded engagement with the end of the larger diameter shaft 8 closes the fluid pressurization passage 72 when it is not in use.

For ease of illustration in describing our device, holes 48, 53, 54, 68 and 70 have been illustrated as individual holes or as pairs of holes in the case of holes 44, 45, 55, 56 and 58. It should be understood, however, that the number of each of these holes may be varied in the construction of our device. Thus, for example, a plurality of holes 54 may be employed which extend through outer sleeve 32 and are located in spaced relation about the periphery of sleeve 32.

In an alternative form of our invention, as shown in FIGS. 3 and 4, variable damping is provided by the arrangement of holes in an outer damping sleeve 76 with respect to holes in an inner damping sleeve 78. A piston rod 80 having a smaller diameter shaft 82 and a larger diameter shaft 84 slides within a cylinder 86 which contains a compressible fluid. An enlarged piston 88 carries a ring 90 which bears against the inner surface of sleeve 78 and sleeve 78 is biased by a spring 92 to the position shown in FIG. 3 and a hole 116 extends through sleeve 76 in the region of the spring.

When piston rod 80 is in the position shown in FIG. 3, three holes, 94, 96 and 100 in inner sleeve 78 are aligned with three holes 102, 104 and 106 in outer damping sleeve 76. A fourth hole 98 in inner sleeve 78 is not in alignment with a hole in outer sleeve 76.

On movement of the piston rod 80 in the direction of arrow C to the position shown in FIG. 4, the spring 92 is compressed and inner sleeve 78 moves relative to outer sleeve 76. This brings holes 94, 96, 98 and 100 into alignment respectively with holes 108, 110, 112 and 114 in outer sleeve 76. At the same time, holes 102, 104 and 106 in outer sleeve 76 are no longer aligned with holes in inner sleeve 78 as a result of the relative movement between sleeves 76 and 78.

The net result of the movement of inner sleeve 78 with respect to outer sleeve 76 from the position shown in FIG. 3 to that shown in FIG. 4 is that four holes, 94, 96, 98 and 100 in inner sleeve 78 now communicate with holes in outer sleeve 76. In the position of the sleeves shown in FIG. 3, only three holes 94, 96 and 100 in sleeve 78 were aligned with holes in outer sleeve 76. Thus, relative movement of the sleeves 76 and 78 has caused a variation in the damping of the spring during relative movement of the piston rod 80 with respect to the cylinder 86.

In addition to a change in the number of holes in communication between sleeves 76 and 78, there is a change in the location of the holes in alignment in going from the position of sleeves 76 and 78 in FIG. 3 to that of FIG. 4. This also changes the damping within the spring during relative movement of sleeves 76 and 78 and can be contrasted with the situation obtained in prior art springs where the piston rod of the spring moves relative to a fixed perforated sleeve.

Another variation of our invention (not shown) involves the use of an inner damping sleeve and outer damping sleeve in which relative movement occurs by rotating one sleeve relative to the other during movement of the piston rod with respect to the cylinder. This, for example, can be accomplished by connecting the inner sleeve to the piston rod through a gear drive or other similar means such that translational movement of the piston rod effects rotational movement of the sleeve.

More than two damping sleeves can be employed, if desired, to provide for infinite design variation in providing variable-damping liquid springs. Also, variable damping may be accomplished, in accord with our invention, by employing a plurality of sleeves in which some sleeves are fixed, some undergo translational movement, and some undergo rotational movement. The sleeves undergoing movement may be actuated in any suitable manner such as response to pressure changes within the spring, a driving connection between the piston rod and one or more sleeves, or the use of an independent drive means. In the latter case, for example, one or more sleeves may be fixed in one position during movement of the piston rod in one direction and may then be actuated to another position and held fixedly in this position during movement of the piston rod in the opposite direction.

If desired, certain of the fixed sleeves may be eliminated by incorporating their structure into the inner wall of the cylinder by appropriate machining. Also, our invention may be employed with liquid springs in which the piston means moves a toroidal cylinder, as opposed to movement in a straight cylinder, as illustrated here.

As illustrated, our invention provides a liquid spring having a damping means which provides a variable fluid flow pattern within the housing such that damping within the spring can be changed during relative movement between the housing and the piston means extending into the housing. This permits tailoring the velocity profile of the piston means during operation of the spring. By means of our invention, the velocity of the piston means can be varied during its movement in one direction with respect to the housing and its velocity can be varied during movement in one direction with respect to its velocity during movement in the opposite direction. This provides liquid springs which are more efficient than springs of the prior art and, therefore, capable of absorbing greater energy with less load being transmitted to the support members for the spring.

We claim:

1. A variable-damping liquid spring comprising:
    a housing adapted to contain a compressible fluid;
    piston means extending into said housing in slidable sealing engagement therewith;
    damping means within said housing to vary the fluid flow pattern within said housing during relative movement between said piston means and said housing, said damping means including an inner damping sleeve in slidable engagement with said piston means and an outer damping sleeve concentrically positioned about said inner damping sleeve in slidable engagement therewith, said inner and outer damping sleeves containing a plurality of apertures, and
    means to cause relative movement between said inner and outer damping sleeves during relative movement of said piston means and said housing, whereby the alignment of the apertures in said inner and outer sleeves is changed in response to relative movement of said piston means and said housing.

2. The liquid spring as defined in claim 1 wherein certain of said apertures are relatively large in size and other of said apertures are relatively small in size.

3. The liquid spring of claim 2 wherein said piston means includes a larger diameter shaft, a piston head on the inner end of said larger diameter shaft and a smaller diameter shaft on the opposite side of said piston head, whereby on relative movement of said larger diameter shaft into said housing the free volume within said housing is reduced.

4. The liquid spring of claim 3 wherein said outer damping sleeve is fixed with respect to said housing and said inner damping sleeve is movable with respect to said outer damping sleeve, said piston head being in slidable engagement with the inner surface of said inner damping sleeve, and means to cause movement of said inner damping sleeve on movement of said piston head.

5. The liquid spring of claim 4 including biasing means positioned within said housing to resiliently bias said inner damping sleeve in the direction of said larger diameter shaft.

6. The liquid spring of claim 3, wherein said smaller diameter shaft extends through one end of said housing and said larger diameter shaft extends through the other end of said housing, such that movement of said larger diameter shaft into said housing causes movement of said smaller diameter shaft out of said housing.

7. A variable-damping liquid spring comprising:
a housing adapted to contain a compressible fluid;
piston means extending into said housing in slidable sealing engagement therewith, said piston means including a larger diameter shaft, a piston head on the inner end of said larger diameter shaft and a smaller diameter shaft on the opposite side of said piston head;
an outer damping sleeve within said housing;
an inner damping sleeve concentrically mounted within said outer damping sleeve in slidable engagement therewith;
said piston head slidably engaging the inner surface of said inner damping sleeve;
a plurality of apertures in said inner and outer damping sleeves, and
means to cause relative movement of said inner damping sleeve with respect to said outer damping sleeve on relative movement of said piston means with respect to said housing such that the alignment of apertures in said inner and outer sleeves changes in response to relative movement of said piston means and said housing.

8. The liquid spring of claim 7 wherein said outer damping sleeve is fixedly mounted within said housing and said inner damping sleeve is movable with respect to said outer damping sleeve.

9. The liquid spring of claim 7 wherein certain of said apertures are relatively large in size and other of said apertures are relatively small in size.

10. The liquid spring of claim 7 including a plurality of circumferentially grooved channels on the exterior surface of said inner damping sleeve, said channels communicating with said apertures in said inner damping sleeve, whereby flow passages between said apertures in said inner damping sleeve and said apertures in said outer damping sleeve are provided when the apertures in said inner damping sleeve and the apertures in said outer damping sleeve are not in rotational alignment.

11. The liquid spring of claim 8 including
an inwardly projecting closure on said inner damping sleeve;
a hole in said closure in slidable engagement with said smaller diameter shaft;
a first chamber bounded by the inner surface of said inner damping sleeve, said closure and the slidable contact between said piston head and said inner damping sleeve;
an inwardly projecting end on said inner damping sleeve, a hole in said end in slidable engagement with said larger diameter shaft;
a second chamber bounded by the inner surface of said inner damping sleeve, said inwardly projecting end and the slidable contact between said piston head and said inner damping sleeve, and
biasing means positioned within said housing to resiliently bias said inner damping sleeve in the direction of said larger diameter shaft, whereby on relative movement of said piston means into said housing the volume of said first chamber is reduced and on relative movement of said piston means away from said housing the volume of said second chamber is reduced.

12. The liquid spring of claim 11 wherein certain of said apertures are relatively large in size and other of said apertures are relatively small in size.

13. The liquid spring of claim 12 wherein said relatively large size apertures are brought into flow communication during relative movement of said piston means into said housing and said relatively small size apertures are brought into flow communication during relative movement of said piston means out of said housing.

14. The liquid spring of claim 13 wherein said biasing means is enclosed by a portion of said outer damping sleeve, and a relatively large and a relatively small hole in said outer damping sleeve in juxtaposition to said biasing means, said relatively large hole being normally open but being capable of being covered by said inner damping sleeve during relative movement of said piston means into said housing.

* * * * *